(12) United States Patent
Shinoda et al.

(10) Patent No.: US 10,749,344 B2
(45) Date of Patent: Aug. 18, 2020

(54) MOTOR DRIVE SYSTEM INCLUDING POWER STORAGE DEVICE

(71) Applicant: FANUC CORPORATION, Minamitsuru-gun, Yamanashi (JP)

(72) Inventors: Shougo Shinoda, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 14 days.

(21) Appl. No.: 16/155,230

(22) Filed: Oct. 9, 2018

(65) Prior Publication Data
US 2019/0115759 A1 Apr. 18, 2019

(30) Foreign Application Priority Data

Oct. 13, 2017 (JP) .................... 2017-199124

(51) Int. Cl.
| | |
|---|---|
| *H02J 3/30* | (2006.01) |
| *B60L 50/30* | (2019.01) |
| *H02J 7/34* | (2006.01) |
| *B60L 50/53* | (2019.01) |
| *H02P 5/74* | (2006.01) |
| *H02P 25/22* | (2006.01) |
| *H02P 27/06* | (2006.01) |

(52) U.S. Cl.
CPC ............... *H02J 3/30* (2013.01); *B60L 50/30* (2019.02); *B60L 50/53* (2019.02); *H02J 7/34* (2013.01); *H02P 5/74* (2013.01); *H02P 25/22* (2013.01); *H02P 27/06* (2013.01)

(58) Field of Classification Search
CPC .. H02P 25/22; H02P 27/06; H02P 5/74; H02P 6/04; H02P 11/04; H02K 7/025; G05B 19/404; H02J 3/30; H02J 7/34; B60L 50/30
See application file for complete search history.

(56) References Cited

U.S. PATENT DOCUMENTS

| | | |
|---|---|---|
| 8,278,849 B2 | 10/2012 | Iwashita et al. |
| 10,133,249 B2 | 11/2018 | Ikai et al. |
| (Continued) | | |

FOREIGN PATENT DOCUMENTS

| | | | | |
|---|---|---|---|---|
| JP | 06038575 A | * | 2/1994 | ............. H02P 27/08 |
| JP | H06038575 A | | 2/1994 | |
| (Continued) | | | | |

*Primary Examiner* — Eduardo Colon Santana
*Assistant Examiner* — Said Bouziane
(74) *Attorney, Agent, or Firm* — RatnerPrestia

(57) ABSTRACT

A motor drive system includes: a converter connected to a DC link; an inverter for drive connected to the DC link; a power storage device configured to store a DC power from the DC link or supplies a DC power to the DC link; a torque limit value calculation unit configured to calculate a torque limit value of a servomotor for buffer in the power storage device on the basis of a rotation speed of the servomotor for buffer and a DC power amount stored or supplied by the power storage device; and a motor control unit for buffer configured to perform a torque control with respect to the servomotor for buffer while changing an upper limit value and a lower limit value of a torque command using the torque limit value so as to adjust a DC power amount stored or supplied by the power storage device.

9 Claims, 6 Drawing Sheets

(56) References Cited

U.S. PATENT DOCUMENTS

| | | | | |
|---|---|---|---|---|
| 2008/0016940 A1* | 1/2008 | Schnneink | ............ | B21D 43/05 |
| | | | | 72/435 |
| 2010/0117568 A1* | 5/2010 | Iwashita | ................ | H02P 21/14 |
| | | | | 318/400.02 |
| 2012/0326641 A1* | 12/2012 | Sakai | ....................... | H02J 3/30 |
| | | | | 318/400.3 |
| 2013/0009576 A1* | 1/2013 | Iwashita | ................ | H02P 27/08 |
| | | | | 318/400.3 |

FOREIGN PATENT DOCUMENTS

| | | | |
|---|---|---|---|
| JP | 2013180716 A | * | 9/2013 |
| JP | 2013-009524 A | | 10/2013 |
| JP | 2015226344 A | | 12/2015 |
| JP | 2016-046833 A | | 4/2016 |
| JP | 2013017305 A | | 7/2017 |
| JP | 2017130995 A | | 7/2017 |
| JP | 2010115063 A | | 10/2018 |

\* cited by examiner

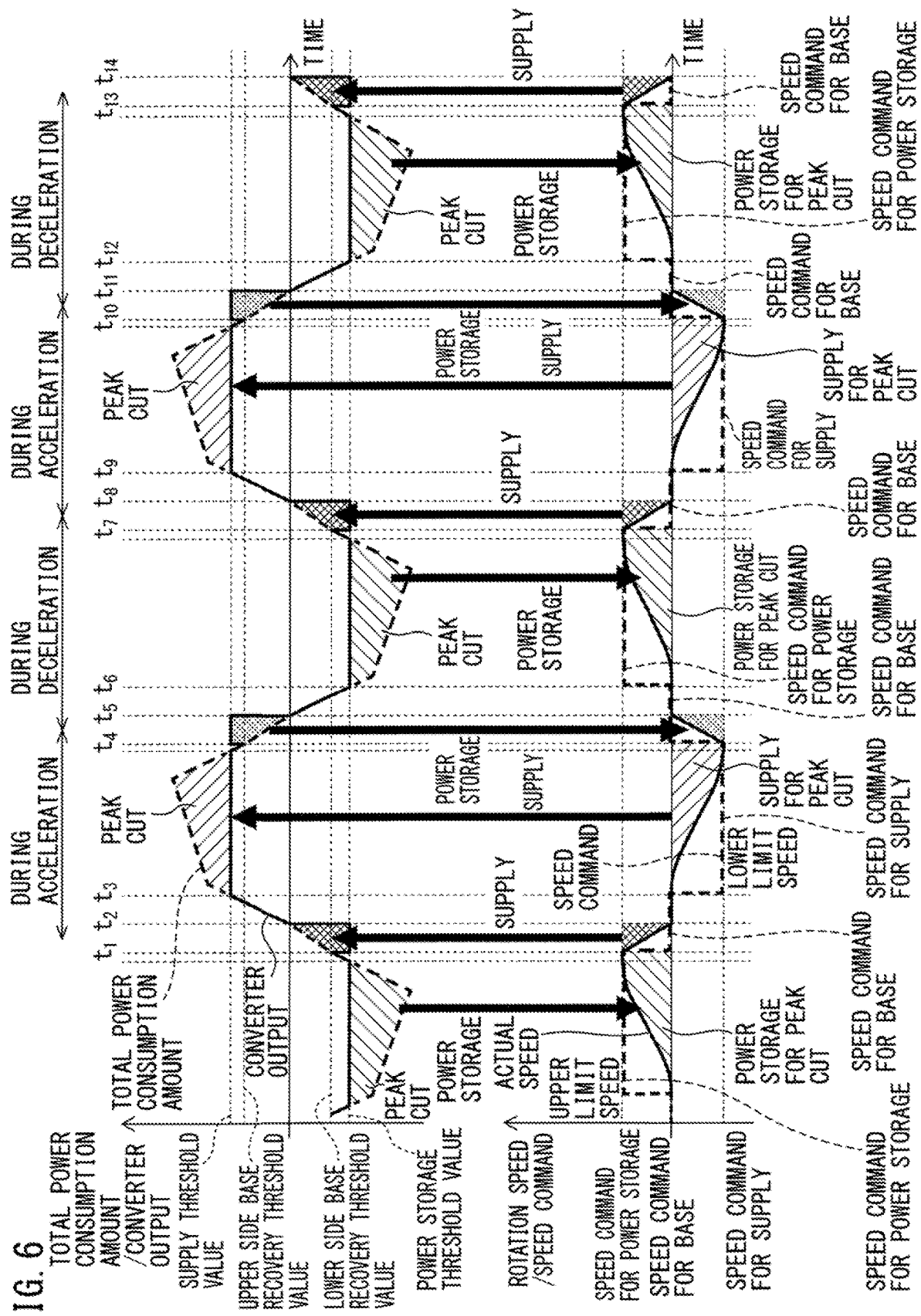

MOTOR DRIVE SYSTEM INCLUDING POWER STORAGE DEVICE

CROSS-REFERENCE TO RELATED APPLICATION

This application is a new U.S. Patent Application that claims benefit of Japanese Patent Application No. 2017-199124, filed Oct. 13, 2017, the disclosure of this application is being incorporated herein by reference in its entirety for all purposes.

BACKGROUND OF THE INVENTION

1. Field of the Invention

The present invention relates to a motor drive system including a power storage device.

2. Description of the Related Art

In a motor drive system for driving a servomotor provided to machines including a machine tool, a robot etc., (hereinafter referred to as "servomotor for drive"), an AC power supplied from a power supply is converted by a converter (rectifier) to a DC power so as to be outputted to a DC link, further, the DC power of the DC link is converted by an inverter to an AC power, and the AC power is used as a drive power of the servomotor for drive. Typically, it is often the case that one converter is provided to a plurality of inverters for the purpose of reducing costs of the motor drive system or a space occupied. In other words, the converter for converting an AC power supplied from the AC power supply to a DC power is configured to be a power supply unit common to the plurality of inverters for drive, and using the DC power outputted from the power supply unit, the plurality of inverters for drive generate an AC power for driving each servomotor for drive.

When, in the motor drive system, the servomotor for drive is controlled to be accelerated or decelerated, an output or regeneration of a large AC power with respect to the AC power supply is demanded so that a power peak occurs. In particular, in the motor drive system in which the plurality of inverters for drive are connected to one converter, a power peak to occur can be also further large. The larger a power peak is, the larger a power supply capacity and operation costs of the motor drive system become, while a power trouble, such as a power failure and flicker, occurs at a power supply side, and it is thus desirable to decrease a power peak.

To decrease a power peak, there has been conventionally employed a method in which the DC link which connects the converter and the inverters for drive of the motor drive system to each other is provided with a power storage device capable of storing a DC power and an energy consumed or regenerated by the servomotor for drive is suitably transferred through the DC link. According to the method, a regenerative power occurring from the servomotor for drive during deceleration of the servomotor for drive can be stored in the power storage device and a stored power can be reused during acceleration of the servomotor for drive so that a power peak can be decreased. In other words, employing the power storage device which transfers a power with respect to the DC link enables an adaptation to also an operation (acceleration or deceleration) of the servomotor for drive which necessitates a power consumption larger than a maximum output power of the power supply unit.

By way of example, in a press machine, a maximum power consumption which is generated while a press operation is performed is very large, which may cause a problem of a power supply capacity shortage. Then, in the motor drive system in the press machine, the DC link is provided with the power storage device, and a power is supplied from the power storage device when the press machine consumes a large power, thereby enabling driving of the press machine under the power supply having a low capacity. Examples of the power storage device may include that which uses a flywheel. For example, when a power consumption of the servomotor for drive is small, a servomotor for buffer to which the flywheel is connected is allowed to rotate at a constant speed, and when a power consumption becomes large due to acceleration or deceleration of the servomotor for drive or the like, a rotation speed of the servomotor for buffer is decreased to perform power regeneration through an inverter for buffer, and a DC power for driving the servomotor for drive is supplied to the DC link. Thereby, also in a case of such an acceleration or deceleration operation as to necessitate a power consumption larger than a maximum power conversion amount which is a maximum power amount within which the converter can convert a power, driving is enabled using a regenerative power from the servomotor for buffer having a rotation energy to which the flywheel is connected.

For example, as disclosed in Japanese Unexamined Patent Publication (Kokai) No. 2013-009524, there has been known a motor drive apparatus, comprising: an AC/DC converter which converts an AC power supplied from an AC power supply to a DC power; a DC/AC converter which converts a DC power to an AC power for driving a motor or converts an AC power regenerated by the motor to a DC power; a DC link unit which connects a DC side of the AC/DC converter to a DC side of the DC/AC converter and delivers the DC power; an energy storage unit which includes at least one capacitor storage unit and at least one flywheel storage unit each of which is connected to the DC link unit and stores the DC power from the DC link unit or supplies the same to the DC link unit; a motor control unit which, on the basis of a motor operation command for commanding an operation of the motor, performs a control so that the DC/AC converter outputs a desired AC power; and an energy control unit which performs a control so that the energy storage unit stores the DC power from the DC link unit or supplies the same to the DC link unit.

For example, as disclosed in Japanese Unexamined Patent Publication (Kokai) No. 2016-046833, there has been known a control system for servomotors for driving axes in an industrial machinery or machine tool, comprising: a plurality of first servomotors configured to drive axes; a plurality of converters configured to convert an AC voltage to a DC voltage; a plurality of first inverters configured to receive a DC voltage from the converters and convert the DC voltage to an AC voltage to drive the plurality of first servomotors or convert an AC power regenerated from the first servomotors to a DC power; a second servomotor configured to rotate an inertial body; a plurality of second inverters configured to receive a DC voltage from the converters and convert the same to an AC voltage to drive the second servomotor or convert an AC power regenerated from the second servomotor to a DC power; and a servomotor control device configured to control the plurality of first servomotors and the second servomotor, wherein the number of the second servomotor is smaller than that of the second inverters, at least one second servomotor includes a plurality of independent windings, and at least a part of the second inverter is connected to the plurality of Independent windings provided to the one second servomotor.

SUMMARY OF INVENTION

In the motor drive system in which the DC link which provides connection between the converter and the inverters for drive is provided with the flywheel type power storage device including the servomotor for buffer and the inverter for buffer, a speed of the servomotor for buffer in the power storage device is controlled so as to perform storage and discharge of a DC power by the power storage device. Consequently, it has been necessary to create a speed command in accordance with an operation state and a power consumption of the servomotor for drive so as to inevitably complicate a control of the servomotor for buffer. Further, since, in general, in a speed control of a servomotor, there is a time lag to follow an actual speed in response to a speed command, the flywheel type power storage device in which a speed control of the servomotor for buffer is performed exhibits a poor responsiveness to a power discharge command and a power storage command. Accordingly, in the motor drive system including such a flywheel type power storage device, it has been desired to realize a power storage device easily controlled and exhibiting a high responsiveness.

According to one aspect of the present disclosure, in a motor drive system including: a converter configured to perform power conversion between an AC power at a power supply side and a DC power in a DC link; an inverter for drive configured to perform power conversion between a DC power in the DC link and an AC power which is a drive power or a regenerative power of a servomotor for drive; a power storage device configured to store a DC power from the DC link or supplies a DC power to the DC link, the power storage device including: a flywheel capable of storing a rotation energy; a servomotor for buffer including a rotation shaft to which the flywheel is connected; and a power storage device including an inverter for buffer configured to perform power conversion between a DC power in the DC link and an AC power which is a drive power or a regenerative power of the servomotor for buffer on the basis of a command received; a torque limit value calculation unit configured to calculate a torque limit value with respect to the servomotor for buffer on the basis of a rotation speed of the servomotor for buffer and a DC power amount stored from the DC link or supplied to the DC link by the power storage device; and a motor control unit for buffer configured to control power conversion of the inverter for buffer so as to control rotation of the servomotor for buffer, in which the motor control unit for buffer performs a torque control with respect to the servomotor for buffer while changing an upper limit value and a lower limit value of a torque command using the torque limit value so as to adjust a DC power amount stored from the DC link or supplied to the DC link by the power storage device.

BRIEF DESCRIPTION OF THE DRAWINGS

The present invention will be more clearly understood with reference to the following accompanying drawings:

FIG. 6 is a diagram illustrating a relationship between the total power consumption amount and a rotation speed of the servomotor for buffer in the motor drive system according to another embodiment.

DETAILED DESCRIPTION

Hereinafter, a motor drive system including a power storage device will be described with reference to the accompanying drawings. In each figure, similar members are assigned similar reference signs. Further, it is assumed that the elements to which the same reference signs are assigned in different drawings mean those having the same functions. Moreover, to facilitate understanding, these figures are suitably changed in scale. In addition, it is assumed that an "output of a servomotor for drive" includes a "power consumption of the servomotor for drive" and a regenerative power of the servomotor for drive" and an "output of a servomotor for buffer" includes a "power consumption of the servomotor for buffer" and a regenerative power of the servomotor for buffer". Still further, a rotation angular velocity of the servomotor for drive and the servomotor for buffer will be simply referred to as "rotation speed".

Figure 1:
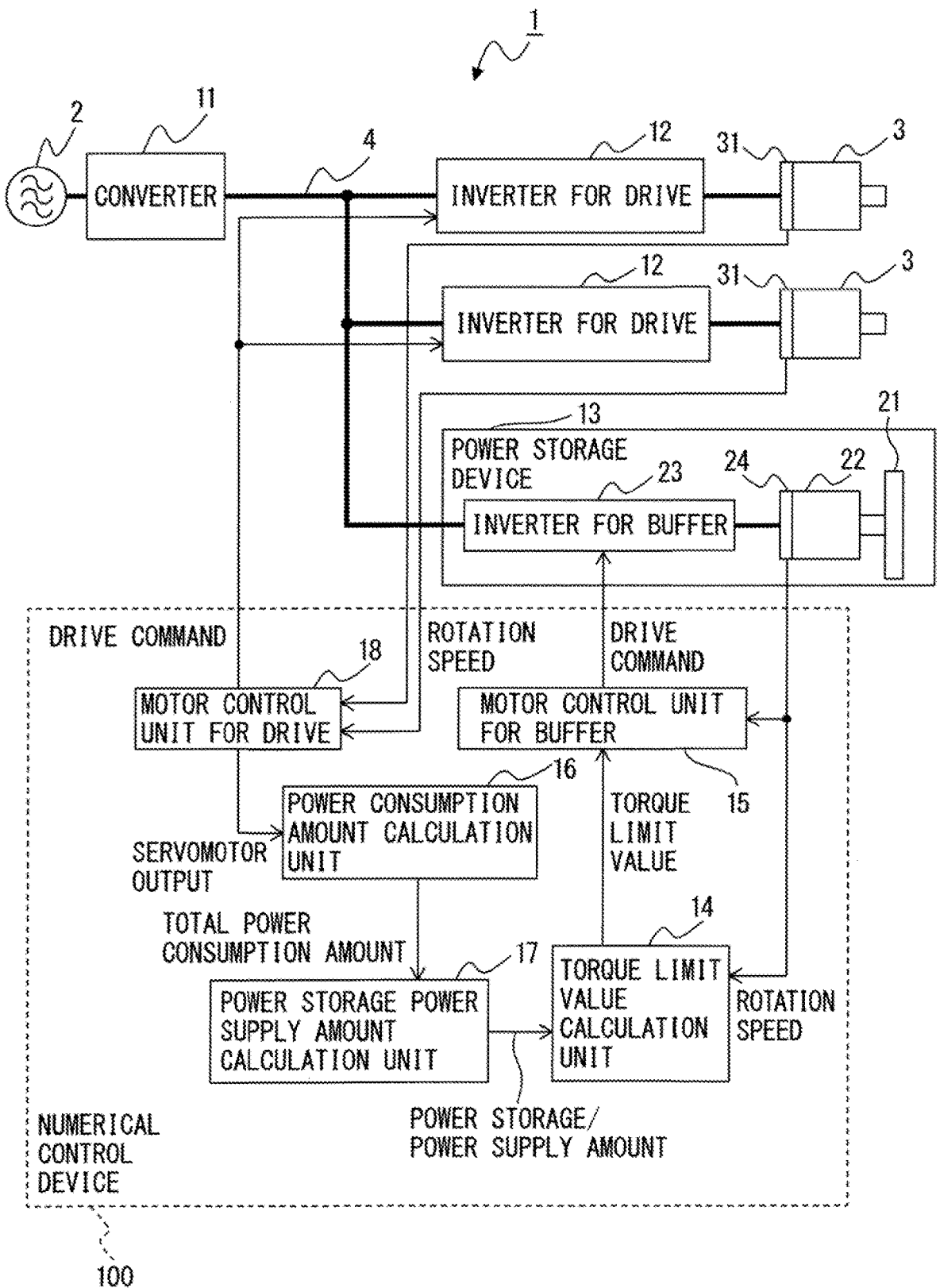
FIG. 1 is a block diagram of a motor drive system according to one embodiment.

FIG. 1 is a block diagram of a motor drive system according to one embodiment. Herein, by way of example, there will be described a case in which two servomotors for drive 3 are controlled by a motor drive system 1 connected to a power supply 2. Note that the number of the servomotor for drive 3 is not to particularly limit the present embodiment and may be one or three or more. Further, the number of phases of the power supply 2, the servomotor for drive 3, and a servomotor for buffer 22 is not to particularly limit the present embodiment and may be, for example, three or one. Still further, also a type of the servomotor for drive 3 and the servomotor for buffer 22 is not to particularly limit the present embodiment and may be, for example, an induction motor or a synchronous motor. Herein, examples of a machine to which the servomotor for drive 3 is provided may include a machine tool, a robot, a forming machinery, an injection molding machine, an industrial machinery, various types of electrical products, a train, a vehicle, a flying machine, and the like.

Before the motor drive system 1 according to one embodiment is described, a drive control with respect to the servomotor for drive 3 will be described. Similarly, to typical motor drive systems, the motor drive system 1 includes a motor control unit for drive 18 for controlling an inverter for drive 12 configured to perform power conversion between a DC power in a DC link 4 and an AC power that is a drive power or a regenerative power of the servomotor for drive 3. The motor control unit for drive 18 generates a drive command for controlling a speed or torque of the servomotor for drive 3 or a position of a rotor on the basis of a speed (of the rotor) of the servomotor for drive 3 detected by a speed detection device 31 (speed feedback), a current flowing through a winding of the servomotor for drive 3 (current feedback), a certain torque command, an operation program of the servomotor for drive 3, or the like. On the basis of the drive command generated by the motor control unit for drive 18, a power conversion operation by the inverter for drive 12 is controlled. Note that a configuration of the motor control unit for drive 18 defined herein is merely illustrative, and the configuration of the motor control unit for drive 18 may be also specified by including terms, such as a position command creation unit, a torque command creation unit, and a switching command creation unit.

As illustrated in FIG. 1, the motor drive system 1 according to one embodiment includes a converter 11, the inverter for drive 12, a power storage device 13, a torque limit value calculation unit 14, a motor control unit for buffer 15, a power consumption amount calculation unit 16, and a power storage power supply amount calculation unit 17.

The converter 11 is a converter configured to perform power conversion between an AC power at a power supply 2 side and a DC power in the DC link 4. The converter 11 is composed of a three-phase bridge circuit when a three-phase AC is supplied from the power supply 2 and composed of a single-phase bridge circuit when a single-phase AC is supplied from the power supply 2. The converter 11 is realized as a power conversion device capable of AC-DC bidirectional conversion which converts an AC power inputted from the power supply 2 side to a DC power and outputs the same to a DC side and, during power regeneration, converts a DC power of the DC link 4 to an AC power and outputs the same to the power supply 2 side, such as a 120-degree conduction type rectifier circuit and a PWM switching control type rectifier circuit. For example, when being a PWM switching control type rectifier circuit, the converter 11 is composed of a bridge circuit of a switching element and a diode connected in antiparallel to the same, and performs AC-DC bidirectional power conversion through an on/off control of each switching element in accordance with a drive command received from an upper-level control device (unillustrated). Examples of the switching element may include a unipolar transistor, such as a field effect transistor (FET), a bipolar transistor, an insulated gate bipolar transistor (IGBT), a thyristor, a gate turn-off thyristor (GTO), and the like, but a type of the switching element itself is not to limit the present embodiment, and the other switching elements may be employed.

Further, with respect to the converter 11, as a maximum power amount within which power conversion from an AC power to a DC power is possible and a maximum power amount within which power conversion from a DC power to an AC power is possible, a "maximum power conversion amount" is specified. The maximum power conversion amount is generally specified as specification data on a conversion capacity of the converter 11 and is indicated, for example, in a specification table or an instruction manual of the converter 11.

Note that the DC link 4 is provided with a DC link capacitor (also referred to as smoothing capacitor), illustration of which is, however, omitted. The DC link capacitor has a function of storing a DC power in the DC link 4 and a function of restraining a ripple portion of a DC output of the converter 11.

To the converter 11, the inverter for drive 12 is connected through the DC link 4. The inverter for drive 12 is configured to be a servo amplifier which converts a DC power in the DC link 4 to an AC power and supplies the same as a drive power to the servomotor for drive 3 so as to drive the servomotor for drive 3. The inverter for drive 12 performs power conversion between a DC power in the DC link 4 and an AC power which is a drive power or a regenerative power of the servomotor for drive 3. In general, the servomotor for drive 3 is provided with one or more windings, and in order to drive the servomotor for drive 3, one inverter for drive 12 per winding in the servomotor for drive 3 is necessary. In FIG. 1, by way of example, the servomotor for drive 3 is of a one-winding type and accordingly one inverter for drive 12 is connected to each servomotor for drive 3. The inverter for drive 12 is composed of a bridge circuit of a switching element and a diode connected in antiparallel to the same, and each switching element is controlled to be turned on/off, for example, on the basis of a PWM switching control of a triangular wave comparison method. The inverter for drive 12 is composed of a three-phase bridge circuit when the servomotor for drive 3 is a three-phase motor and composed of a single-phase bridge circuit when the servomotor for drive 3 is a single-phase motor. Examples of the switching element may include a unipolar transistor, such as a FET, a bipolar transistor, an IGBT, a thyristor, a GTO, and the like, but a type of the switching element itself is not to limit the present embodiment, and the other switching elements may be employed.

The inverter for drive 12 performs power conversion between a DC power in the DC link 4 and an AC power which is a drive power or a regenerative power of the servomotor for drive 3 through an on/off control of each switching element in accordance with a drive command received from the motor control unit for drive 18. Further in detail, the inverter for drive 12 allows the internal switching element to perform a switching operation on the basis of a drive command received from the motor control unit for drive 18, and converts a DC power supplied from the converter 11 through the DC link 4 to an AC power having a desirable voltage and a desirable frequency for driving the servomotor for drive 3 (inversion operation). Accordingly, the servomotor for drive 3 is configured to operate, for example, on the basis of an AC power having a variable voltage and a variable frequency. Further, while a regenerative power is generated during deceleration of the servomotor for drive 3, the internal switching element is allowed to perform a switching operation on the basis of a drive command received from the motor control unit for drive 18, and an AC regenerative power generated in the servomotor for drive 3 is converted to a DC power and returns the same to the DC link 4 (conversion operation).

The power storage device 13 stores a DC power from the DC link 4 or supplies a DC power to the DC link 4. The power storage device 13 includes a flywheel 21 capable of storing a rotation energy, the servomotor for buffer 22 including a rotation shaft to which the flywheel 21 is connected, and an inverter for buffer 23 configured to perform power conversion between a DC power in the DC link 4 and an AC power which is a drive power or a regenerative power of the servomotor for buffer 22 on the basis of a command received.

The inverter for buffer 23 performs power conversion between a DC power in the DC link 4 and an AC power which is a drive power or a regenerative power of the servomotor for buffer 22 through an on/off control of each switching element in accordance with a drive command received from the motor control unit for buffer 15. The inverter for buffer 23 is composed of a bridge circuit of a switching element and a diode connected in antiparallel to the same. The inverter for buffer 23 is composed of a three-phase bridge circuit when the servomotor for buffer 22 is a three-phase motor and composed of a single-phase bridge circuit when the servomotor for buffer 22 is a single-phase motor. Examples of the switching element may include a unipolar transistor, such as a FET, a bipolar transistor, an IGBT, a thyristor, a GTO, and the like, but a type of the switching element itself is not to limit the present embodiment, and the other switching elements may be employed. For example, on the basis of a PWM switching signal obtained by comparing a received drive command with a triangular wave carrier, each switching element in the inverter for buffer 23 is controlled to be turned on/off.

The motor control unit for buffer 15 controls power conversion of the inverter for buffer 23, whereby the servomotor for buffer 22 to which the flywheel 21 is connected rotates while accelerating or decelerating, or rotates at a constant speed, and as a result, a DC power amount to be stored or supplied by the power storage device 13 (a DC power amount giving in and taking from by the power storage device 13 with respect to the DC link 4) is adjusted. A further detailed description will be made in the following.

In a case of performing storage of a DC power by the power storage device 13, the inverter for buffer 23 performs an inversion operation to convert a DC power in the DC link 4 to an AC power on the basis of a drive command received from the motor control unit for buffer 15. Accordingly, an electrical energy from the DC link 4 is taken into a servomotor for buffer 22 side, and this electrical energy allows the servomotor for buffer 22 to which the flywheel 21 is connected to rotate. Thus, in the flywheel type power storage device 13, an electrical energy flowing from the DC link 4 into the same is converted to a rotation energy of the flywheel 21 and stored.

Further, in a case of performing supply of a DC power by the power storage device 13, the inverter for buffer 23 generates an AC regenerative power by deceleration of the servomotor for buffer 22 to which the flywheel 21 is connected and performs a conversion operation to convert this AC power to a DC power on the basis of a drive command received from the motor control unit for buffer 15. Accordingly, a rotation energy stored in the flywheel 21 is converted to an electrical energy and supplied to the DC link 4.

Figure 2:
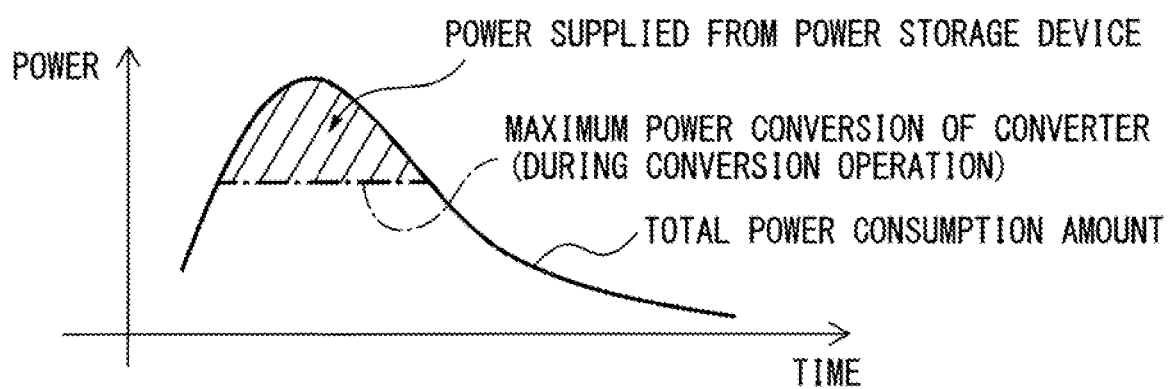
FIG. 2 is a diagram illustrating a relationship between a DC power supplied from a power storage device and a DC power supplied from a converter in the motor drive system according to one embodiment.

The motor drive system 1 is provided with the power storage device 13 configured to perform the above operation so that during acceleration of the servomotor for drive 3, in addition to an energy supplied from the converter 11, an energy stored in the power storage device 13 is supplied to the servomotor for drive 3 and used as a power for acceleration of the servomotor for drive 3. FIG. 2 is a diagram illustrating a relationship between a DC power supplied from a power storage device and a DC power supplied from a converter in the motor drive system according to one embodiment. A power supplied from the converter 11 to the DC link 4 is consumed as a drive power of the servomotor for drive 3 (to which, in other words, an output of the servomotor for drive 3 corresponds) and also as a winding loss at the servomotor for drive 3, a loss at the converter 11, and a loss at the inverter for drive 12. Herein, a sum total of powers consumed at the servomotor for drive 3, the inverter for drive 12, and the converter 11 is referred to as "total power consumption", which is indicated by the solid line in FIG. 2. The alternate long and short dash line indicates the maximum power conversion amount in a conversion operation of the converter 11. As illustrated in FIG. 2, from the total power consumption, a portion exceeding a maximum power supply of the converter 11 (region indicated by oblique lines in the figure) is compensated by a DC power supplied from the power storage device 13 to the DC link 4.

In the motor drive system 1, during deceleration of the servomotor for drive 3, an energy regenerated from the servomotor for drive 3 is stored in the power storage device 13. An energy stored in the power storage device 13 is used together with a power supplied by the converter 11 to drive the servomotor for drive 3 so that the servomotor for drive 3 can be driven by an output exceeding the maximum power conversion amount of the converter 11 and a power peak can be decreased. Due to a decrease of the power peak, a power supply capacity and operation costs of the motor drive system 1 can be decreased and a power failure and flicker at the power supply 2 side can be avoided.

The torque limit value calculation unit 14 calculates a torque limit value with respect to the servomotor for buffer 22 on the basis of a rotation speed of the servomotor for buffer 22 detected by a speed detection device 24 and a DC power amount stored from the DC link 4 or supplied to the DC link 4 by the power storage device 13. The torque limit value is set with respect to a torque command to the servomotor for buffer 22 and will be later described in detail.

The motor control unit for buffer 15 outputs a drive command to the inverter for buffer 23 in order to adjust a DC power amount to be stored or supplied by the power storage device 13. In response to the received drive command, the inverter for buffer 23 performs an inversion operation (power operation) to convert a DC power in the DC link 4 to an AC power and supply the same to the servomotor for buffer 22 or a conversion operation (regeneration operation) to convert an AC power regenerated from the servomotor for buffer 22 to a DC power and return the same to the DC link 4. In the present embodiment, the motor control unit for buffer 15 performs a torque control with respect to the servomotor for buffer 22 while changing an upper limit value and a lower limit value of a torque command using the torque limit value calculated by the torque limit value calculation unit 14 so as to adjust a DC power amount stored from the DC link 4 or supplied to the DC link 4 by the power storage device 13.

The torque limit value calculation unit 14, the motor control unit for buffer 15, the power consumption amount calculation unit 16, and the power storage power supply amount calculation unit 17 as described above are provided, for example, together with the motor control unit for drive 18 within a numerical control device 100. The torque limit value calculation unit 14, the motor control unit for buffer 15, the power consumption amount calculation unit 16, and the power storage power supply amount calculation unit 17 may be configured, for example, in the form of a software program or may be configured by a combination of each type of electronic circuits and a software program. In the embodiment as illustrated in FIG. 1, the torque limit value calculation unit 14, the motor control unit for buffer 15, the power consumption amount calculation unit 16, and the power storage power supply amount calculation unit 17 is configured in the form of a software program, and an arithmetic processing unit in the numerical control device 100 is allowed to operate such a software program, thereby realizing a function of each unit.

Alternatively, a computer which operates in accordance with a software program medium for realizing a function of the torque limit value calculation unit 14, the motor control unit for buffer 15, the power consumption amount calculation unit 16, and the power storage power supply amount calculation unit 17 may be provided separately from the numerical control device 100. Further alternatively, the torque limit value calculation unit 14, the motor control unit for buffer 15, the power consumption amount calculation unit 16, and the power storage power supply amount calculation unit 17 may be realized as a semiconductor integrated circuit in which a software program medium for realizing a function of each unit is written, and in such a case, the semiconductor integrated circuit is installed, for example, in an existing numerical control device, thereby realizing a function of each unit.

Subsequently, a torque control using a torque limit value will be described further in detail.

As described above, storage of the flywheel type power storage device 13 is realized by storing an electrical energy taken into the servomotor for buffer 22 side through a conversion operation (inversion) from a DC power to an AC power by the inverter for buffer 23 as a rotation energy of the servomotor for buffer 22 to which the flywheel 21 is connected. Further, power supply of the flywheel type power storage device 13 is realized by allowing an AC regenerative power to be generated by deceleration of the servomotor for buffer 22 to which the flywheel 21 is connected, converting a rotation energy stored in the flywheel 21 to an electrical energy through a conversion operation (conversion) from an AC power to a DC power by the inverter for buffer 23, and supply to the DC link 4. In other words, to a DC power amount stored from the DC link 4 or supplied to the DC link 4 by the power storage device 13, an output of the servomotor for buffer 22 in the power storage device 13 corresponds.

In general, an output of a servomotor is expressed on the basis of a rotation speed (rotation angular velocity) of the servomotor and a torque of the servomotor as Equation 1:

$$\text{Output of servomotor [W]} = \text{rotation speed [rad/s]} \times \text{torque [Nm]} \quad (1)$$

The above Equation 1 also holds with respect to the servomotor for buffer 22. When Equation 1 is transformed in terms of the servomotor for buffer 22, Equation 2 is obtained.

$$\text{Torque of servomotor for buffer 22 [Nm]} = \text{output of servomotor for buffer 22 [W]} / \text{rotation speed of servomotor for buffer 22 [rad/s]} \quad (2)$$

Figure 3:
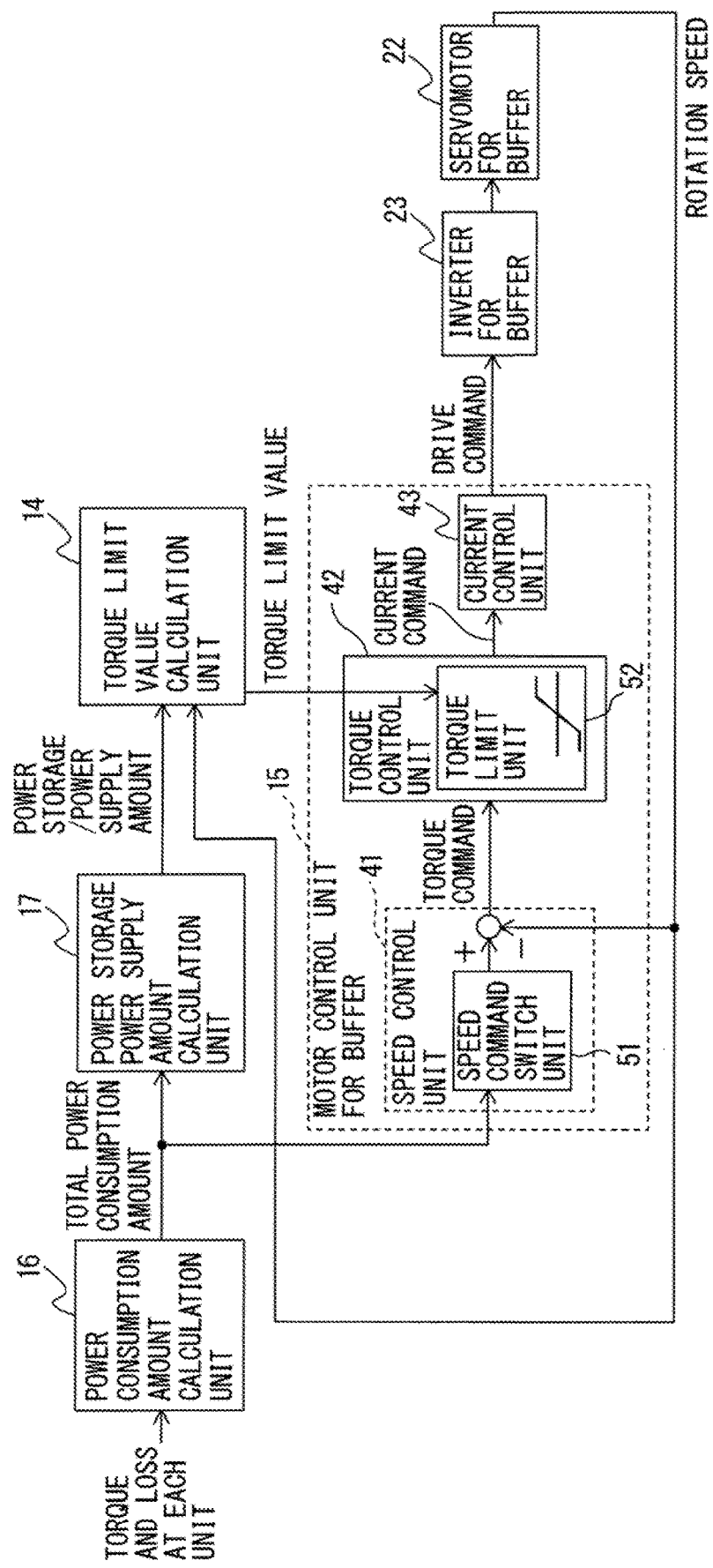
FIG. 3 is a block diagram illustrating a control loop with respect to a servomotor for buffer in the power storage device in the motor drive system according to one embodiment.

As described above, to a DC power amount stored from the DC link 4 or supplied to the DC link 4 by the power storage device 13, an output of the servomotor for buffer 22 in the power storage device 13 corresponds. Then, in the present embodiment, a torque control is performed using a torque of the servomotor for buffer 22 as a torque limit value with respect to a torque command so as to adjust a DC power amount stored from the DC link 4 or supplied to the DC link 4 by the power storage device 13. FIG. 3 is a block diagram illustrating a control loop with respect to a servomotor for buffer in the power storage device in the motor drive system according to one embodiment.

As illustrated in FIG. 3, the power consumption amount calculation unit 16 calculates a total power consumption amount obtained as a sum of an output of the servomotor for drive 3, a winding loss at the servomotor for drive 3, a loss at the converter 11, and a loss at the inverter for drive 12. Herein, an output of the servomotor for drive 3 is obtained in accordance with Equation 1 from a multiplication of a rotation speed of the servomotor for drive 3 detected by the speed detection device 31 and a torque of the servomotor for drive 3. When the servomotor for drive 3 is accelerated, the servomotor for drive 3 consumes an AC power supplied from the inverter for drive 12, and an output of the servomotor for drive 3 during such a power consumption is set to be "positive". Accordingly, when a power is regenerated due to deceleration of the servomotor for drive 3, an output of the servomotor for drive 3 is "negative". Because usually, a winding loss at the servomotor for drive 3, a loss at the converter 11, and a loss at the inverter for drive 12 are smaller than an absolute value of an output of the servomotor for drive 3, an influence of an output of the servomotor for drive 3 on the total power consumption amount is dominant. Thus, the positive/negative of an output of the servomotor for drive 3 substantially corresponds to the positive/negative of the total power consumption amount.

Note that because there exists a loss also at the inverter for buffer 23, the power consumption amount calculation unit 16 may calculate, as the total power consumption amount, a further addition of a loss at the inverter for buffer 23 to a sum of an output of the servomotor for drive 3, a winding loss at the servomotor for drive 3, a loss at the converter 11, and a loss at the inverter for drive 12.

The power storage power supply amount calculation unit 17 calculates a DC power amount stored from the DC link 4 or supplied to the DC link 4 by the power storage device 13 on the basis of the total power consumption amount calculated by the power consumption amount calculation unit 16 and the maximum power conversion amount of the converter 11. Further in detail, the power storage power supply amount calculation unit 17 calculates a difference between the maximum power conversion amount of the converter 11 and the total power consumption amount calculated by the power consumption amount calculation unit 16 (i.e. a value in which the total power consumption amount is subtracted from the maximum power conversion amount). A difference between the maximum power conversion amount of the converter 11 and the total power consumption amount calculated by the power consumption amount calculation unit 16 corresponds to a DC power amount stored from the DC link 4 or supplied to the DC link 4 by the power storage device 13. For example, when a difference between the maximum power conversion amount with respect to a conversion operation of the converter 11 and the total power consumption amount calculated by the power consumption amount calculation unit 16 is negative, a total power consumption exceeds a maximum power supply during conversion of the converter 11, in other words, an energy taken in from the power supply 2 side into the DC link 4 by the converter 11 fails to cover the entirety of the total power consumption amount, and accordingly, a shortage thereof is compensated by a DC power supplied from the power storage device 13 to the DC link 4. Further, for example, when a difference between an absolute value of the maximum power conversion amount with respect to an inversion operation of the converter 11 and an absolute value of the total power consumption amount calculated by the power consumption amount calculation unit 16 is negative, a total power consumption exceeds a maximum regenerative power during inversion of the converter 11, and accordingly, an exceeding portion thereof is stored in the power storage device 13.

Note that in general, there exists in a servomotor a drive efficiency (ratio of an output of the servomotor to a drive power supplied to the servomotor), and in consideration of a drive efficiency of the servomotor for buffer 22, a DC power amount stored from the DC link 4 or supplied to the DC link 4 by the power storage device 13 may be calculated. In other words, the power storage power supply amount calculation unit 17 may calculate a DC power amount stored from the DC link 4 or supplied to the DC link 4 by the power storage device 13 on the basis of the total power consumption amount, the maximum power conversion amount specified as a maximum power amount within which power conversion by the converter 11 is possible, and a drive efficiency of the servomotor for buffer 22. For example, when the power storage device 13 including the servomotor for buffer 22 having a drive efficiency of 90% supplies a DC power to the DC link 4, the power storage power supply amount calculation unit 17 calculates, as a DC power amount supplied from the power storage device 13 to the DC link 4, a value obtained by further multiplying a difference between the maximum power conversion amount of the converter 11 and the total power consumption amount calculated by the power consumption amount calculation unit 16 by "100/90". Further, when the power storage device 13 including the servomotor for buffer 22 having a drive efficiency of 90% stores a DC power from the DC link 4, the power storage power supply amount calculation unit 17 calculates, as a DC power amount stored from the DC link 4 by the power storage device 13, a value obtained by further multiplying a difference between the maximum power conversion amount of the converter 11 and the total power consumption amount calculated by the power consumption amount calculation unit 16 by "90/100".

The torque limit value calculation unit 14 calculates a torque limit value with respect to the servomotor for buffer 22 on the basis of a rotation speed of the servomotor for buffer 22 detected by the speed detection device 24 and a DC power amount stored from the DC link 4 or supplied to the DC link 4 by the power storage device 13. As described above, to a DC power amount stored from the DC link 4 or supplied to the DC link 4 by the power storage device 13, a difference between the maximum power conversion amount of the converter 11 and the total power consumption amount calculated by the power consumption amount calculation unit 16 corresponds. Further, to a DC power amount stored from the DC link 4 or supplied to the DC link 4 by the power storage device 13, an output of the servomotor for buffer 22 in the power storage device 13 corresponds.

Then, the torque limit value calculation unit 14 calculates a torque limit value by dividing a "difference between the maximum power conversion amount of the converter 11 and the total power consumption amount" calculated by the power storage power supply amount calculation unit 17 by a rotation speed of the servomotor for buffer 22 detected by the speed detection device 24. A torque limit value is employed in a torque control unit 42 in the motor control unit for buffer 15 as a torque limit value with respect to a torque command. Calculation of a torque limit value will be later described in detail.

Further, as illustrated in FIG. 3, the motor control unit for buffer 15 includes a speed control unit 41 configured to perform a speed feedback control to allow a rotation speed of the servomotor for buffer 22 to follow a speed command, the torque control unit 42 configured to perform a torque control using a torque command generated by the speed control unit 41 and a torque limit value calculated by the torque limit value calculation unit 14, and a current control unit 43 configured to perform a current control on the basis of a current command generated by the torque control unit 42.

The speed control unit 41 performs a speed feedback control to allow a rotation speed of the servomotor for buffer 22 as a control target to follow a speed command set by a speed command switch unit 51. If a magnitude relationship between the maximum power conversion amount of the converter 11 and the total power consumption amount calculated by the power consumption amount calculation unit 16 is determined, it is accordingly determined whether a DC power is to be stored from the DC link 4 in the power storage device 13 by accelerating the servomotor for buffer 22 or a DC power is to be supplied from the power storage device 13 to the DC link 4 by decelerating the servomotor for buffer 22. In the present embodiment, a supply threshold value which is a first threshold value is set to be the maximum power conversion amount with respect to a conversion operation in which the converter 11 performs power conversion of an AC power to a DC power. Further, a power storage threshold value which is a second threshold value is set to be the maximum power conversion amount with respect to an inversion operation in which the converter 11 performs power conversion of a DC power to an AC power. Note that the power storage threshold value is set to be a value smaller than the supply threshold value. Alternatively, in consideration of safety of the converter 11, it is also possible that the supply threshold value is set to be a value smaller than the maximum power conversion amount with respect to a conversion operation and the power storage threshold value is set to be a value larger than the maximum power conversion amount with respect to an inversion operation.

The motor control unit for buffer 15 controls power conversion of the inverter for buffer 23 so that the servomotor for buffer 22 rotates at a rotation speed for power supply smaller than a predetermined base rotation speed when the total power consumption amount exceeds the supply threshold value (first threshold value). Further, the motor control unit for buffer 15 controls power conversion of the inverter for buffer 23 so that the servomotor for buffer 22 rotates at a rotation speed for power storage larger than the base rotation speed when the total power consumption amount falls below the power storage threshold value, (second threshold value). In addition, the motor control unit for buffer 15 controls power conversion of the inverter for buffer 23 so that the servomotor for buffer 22 rotates at the base rotation speed when the total power consumption amount falls between the supply threshold value (first threshold value) and the power storage threshold value (second threshold value). Thus, in the present embodiment, the speed command switch unit 51 in the motor control unit for buffer 15 outputs a speed command for supply as a speed command so as to allow the servomotor for buffer 22 to rotate at the rotation speed for power supply when the total power consumption amount exceeds the supply threshold value (first threshold value). Further, the speed command switch unit 51 in the motor control unit for buffer 15 outputs a speed command for power storage as a speed command so as to allow the servomotor for buffer 22 to rotate at the rotation speed for power storage when the total power consumption amount falls below the power storage threshold value (second threshold value). Still further, the speed command switch unit 51 in the motor control unit for buffer 15 outputs a speed command for base as a speed command so as to allow the servomotor for buffer 22 to rotate at the base rotation speed when the total power consumption amount falls between the supply threshold value (first threshold value) and the power storage threshold value (second threshold value).

Thus, in the present embodiment, a speed command set by the speed command switch unit 51 is simplified into merely three types including the speed command for supply, the speed command for power storage, and the speed command for base so that a control is facilitated. Further, creating a speed command in accordance with an operation state and a power consumption of the servomotor for drive 3 is unnecessary, and an operation program of the servomotor for buffer 22 can be simplified. The speed command for supply, the speed command for power storage, and the speed command for base may be set to be a predetermined constant value. Alternatively, it is also possible that an output of the servomotor for drive 3 is measured in advance and from such a measurement result, a power necessary for power storage and power supply is calculated so as to determine the speed command for supply, the speed command for power storage, and the speed command for base.

The speed control unit 41 in the motor control unit for buffer 15 generates a torque command for allowing a rotation speed of the servomotor for buffer 22 to follow a speed command set by the speed command switch unit 51. The torque control unit 42 in the motor control unit for buffer 15 performs a torque control with respect to the servomotor for buffer 22 while changing an upper limit value and a lower limit value of a torque command using a torque limit value calculated by the torque limit value calculation unit 14, and generates a current command. In other words, the torque control unit 42 includes a torque limit unit 52 as a limiter to limit a torque command using a torque limit value.

As described above, when the total power consumption amount calculated by the power consumption amount calculation unit 16 exceeds the supply threshold value (first threshold value), the motor control unit for buffer 15 performs switching from the speed command for base to allow the servomotor for buffer 22 to rotate at the base rotation speed to the speed command for supply to allow the same to rotate at the rotation speed for power supply. In such a case, the torque limit value calculation unit 14 calculates a torque limit value with respect to the servomotor for buffer 22 using the below Equation 3. The torque limit value calculated in accordance with Equation 3 and used to perform switching from the speed command for base to the speed command for supply is a value smaller than or equal to 0.

$$\text{Torque limit value [Nm]} = (\text{supply threshold value [W]} - \text{total power consumption amount [W]})/\text{rotation speed of servomotor for buffer 22 [rad/s]} \quad (3)$$

Further, when the total power consumption amount calculated by the power consumption amount calculation unit 16 falls below the power storage threshold value (second threshold value), the motor control unit for buffer 15 performs switching from the speed command for base to allow the servomotor for buffer 22 to rotate at the base rotation speed to the speed command for power storage to allow the same to rotate at the rotation speed for power storage. In such a case, the torque limit value calculation unit 14 calculates a torque limit value with respect to the servomotor for buffer 22 using the below Equation 4. The torque limit value calculated in accordance with Equation 5 and used to perform switching from the speed command for base to the speed command for power storage is a value larger than or equal to 0.

$$\text{Torque limit value [Nm]} = (\text{power storage threshold value [W]} - \text{total power consumption amount [W]})/\text{rotation speed of servomotor for buffer 22 [rad/s]} \quad (4)$$

Still further, when the total power consumption amount calculated by the power consumption amount calculation unit 16 as exceeding the supply threshold value, falls below the supply threshold value, the motor control unit for buffer 15 performs switching from the speed command for supply to allow the servomotor for buffer 22 to rotate at the rotation speed for power supply to the speed command for base to allow the same to rotate at the base rotation speed. In such a case, the torque limit value calculation unit 14 calculates a torque limit value with respect to the servomotor for buffer 22 using the below Equation 5. The torque limit value calculated in accordance with Equation 5 and used to perform switching from the speed command for supply to the speed command for base is a value larger than or equal to 0.

$$\text{Torque limit value [Nm]} = (\text{supply threshold value [W]} - \text{total power consumption amount [W]})/\text{rotation speed of servomotor for buffer 22 [rad/s]} \quad (5)$$

Still further, when the total power consumption amount calculated by the power consumption amount with respect to DC link 4-A calculation unit 16 as falling below the power storage threshold value (second threshold value), exceeds the power storage threshold value, the motor control unit for buffer 15 performs switching from the speed command for power storage to allow the servomotor for buffer 22 to rotate at the rotation speed for power storage to the speed command for base to allow the same to rotate at the base rotation speed. In such a case, the torque limit value calculation unit 14 calculates a torque limit value with respect to the servomotor for buffer 22 using the below Equation 6. The torque limit value calculated in accordance with Equation 6 and used to perform switching from the speed command for power storage to the speed command for base is a value smaller than or equal to 0.

$$\text{Torque limit value [Nm]} = (\text{power storage threshold value [W]} - \text{total power consumption amount [W]})/\text{rotation speed of servomotor for buffer 22 [rad/s]} \quad (6)$$

Note that in Equations 3 to 6, a rotation speed [rad/s] of the servomotor for buffer 22 is a positive number.

The torque control unit 42 in the motor control unit for buffer 15 performs a torque control with respect to the servomotor for buffer 22 while changing an upper limit value and a lower limit value of a torque command using a torque limit value calculated by the torque limit value calculation unit 14 in accordance with Equations 3 to 6, and generates a current command. In other words, the torque limit unit 52 in the torque control unit 42 limits an upper limit value and a lower limit value of a torque command using a torque limit value as expressed by the below Equation 7.

$$-|\text{Torque limit value}| \leq \text{torque command} \leq |\text{torque limit value}| \quad (7)$$

The current control unit 43 in the motor control unit for buffer 15 generates a drive command for allowing a current flowing in the inverter for buffer 23 to follow a current command generated by the torque control unit 42. A drive command generated by the current control unit 43 is transmitted to the inverter for buffer 23, and the inverter for buffer 23 performs power conversion between a DC power in the DC link 4 and an AC power which is a drive power or a regenerative power of the servomotor for buffer 22 through an on/off control of each switching element in accordance with the drive command. As a result, the servomotor for buffer 22 to which the flywheel 21 is connected rotates while accelerating or decelerating, or rotates at a constant speed.

Thus, in the present embodiment, a torque control with respect to the servomotor for buffer 22 while changing an upper limit value and a lower limit value of a torque command using a torque limit value calculated according to Equation 3 to 6 is performed so that a rotation speed of the servomotor for buffer 22 follows a speed command set by the speed command switch unit 51. A torque limit value is set using the total power consumption amount calculated by the power consumption amount calculation unit 16, and the servomotor for buffer 22 is driven in accordance with a torque control using the torque limit value so that a responsiveness of the power storage device 13 is enhanced.

Figure 4A:
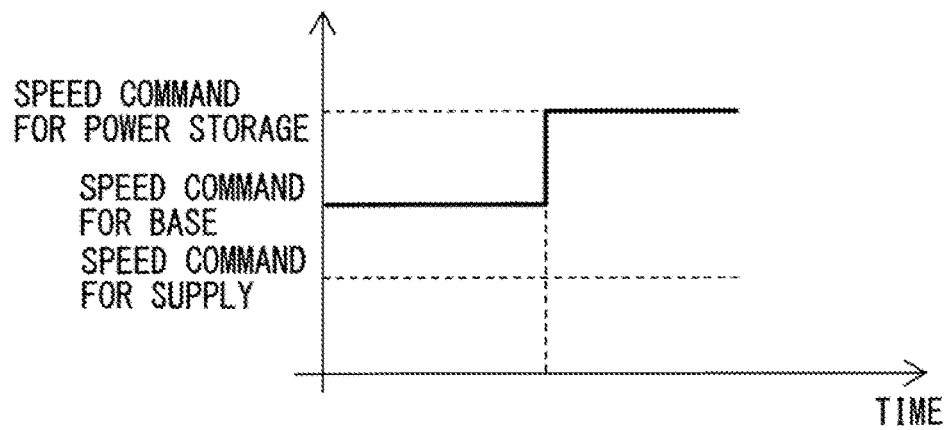
FIG. 4A is a diagram illustrating an example of switching a speed command in the motor drive system according to one embodiment, and illustrates an example of switching the same in a stepwise manner each between speed commands.
Figure 4B:
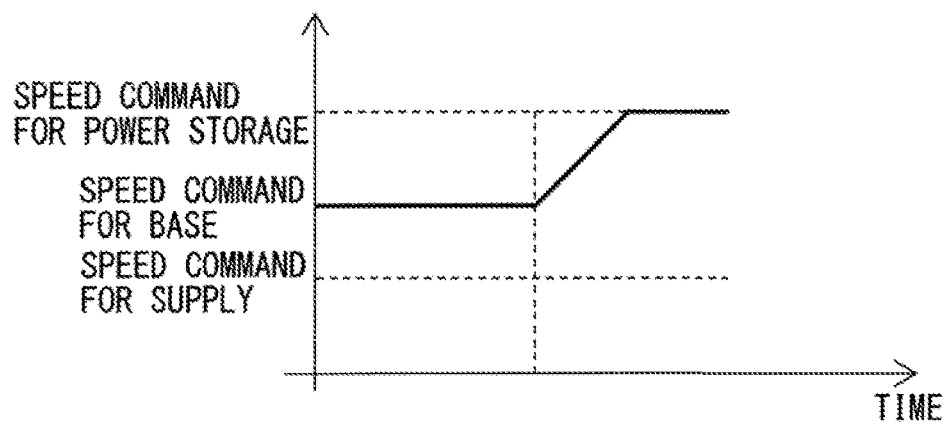
FIG. 4B is a diagram illustrating an example of switching of a speed command in the motor drive system according to one embodiment, and illustrates an example of switching the same while changing the same with a linear time constant each between the speed commands.
Figure 4C:
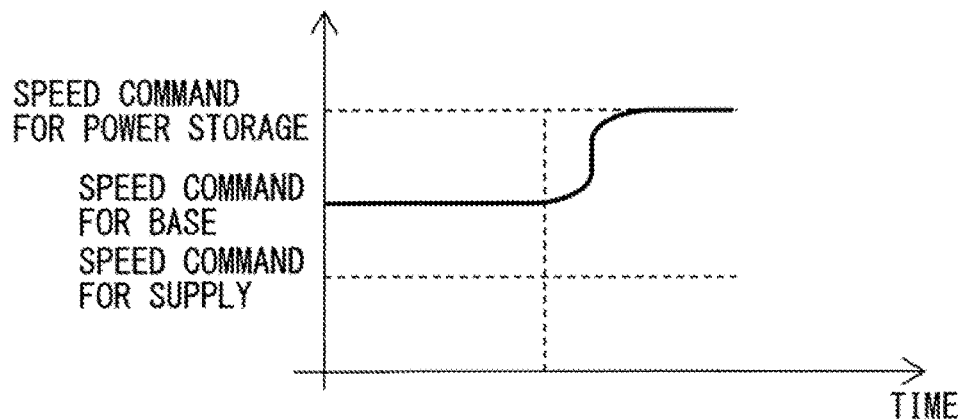
FIG. 4C is a diagram illustrating an example of switching of a speed command in the motor drive system according to one embodiment, and illustrates an example of switching the same while changing the same with a bell-shaped time constant each between the speed commands.
Figure 4D:
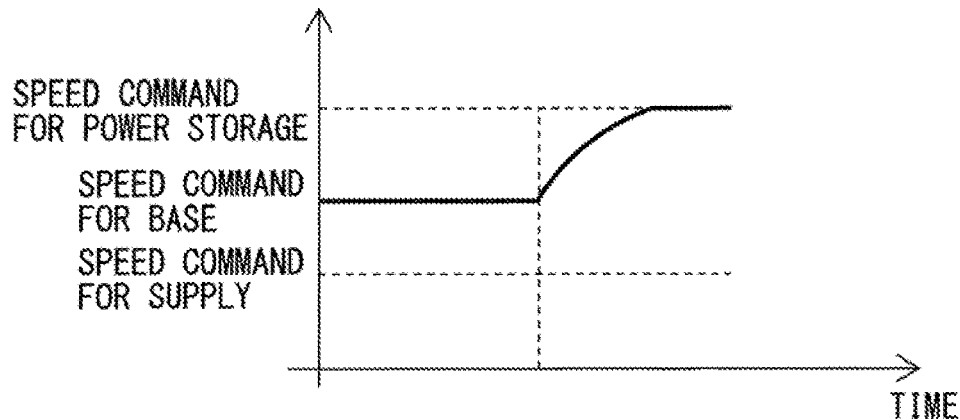
FIG. 4D is a diagram illustrating an example of switching of a speed command in the motor drive system according to one embodiment, and illustrates an example of switching the same while changing the same with an exponential time constant each between the speed commands.

FIG. 4A is a diagram illustrating an example of switching a speed command in the motor drive system according to one embodiment, and illustrates an example of switching the same in a stepwise manner each between speed commands. FIG. 4B is a diagram illustrating an example of switching of a speed command in the motor drive system according to one embodiment, and illustrates an example of switching the same while changing the same with a linear time constant each between the speed commands. FIG. 4C is a diagram illustrating an example of switching of a speed command in the motor drive system according to one embodiment, and illustrates an example of switching the same while changing the same with a bell-shaped time constant each between the speed commands. FIG. 4D is a diagram illustrating an example of switching of a speed command in the motor drive system according to one embodiment, and illustrates an example of switching the same while changing the same with an exponential time constant each between the speed commands. As described above, a speed command employed by the speed control unit 41 is of three types including the speed command for supply, the speed command for power storage, and the speed command for base, and in accordance with a magnitude relationship between the total power consumption amount calculated by the power consumption amount calculation unit 16 and each threshold value, the speed command switch unit 51 provided to the speed control unit 41 in the motor control unit for buffer 15 performs switching among such speed commands. In FIGS. 4A to 4D, to clarify the illustration, switching from the speed command for base to the speed command for power storage is illustrated, but switching from the peed command for power storage to the speed command for base, switching from the speed command for base to the speed command for supply, and switching from the speed command for supply to the speed command for base can be also similarly performed.

For example, it is also possible that the speed command switch unit 51 performs switching of respective speed commands for rotating the servomotor for buffer 22 at the rotation speed for power supply, the base rotation speed, and the rotation speed for power storage in a stepwise manner each between the speed commands. Switching in a stepwise manner each between the speed commands allows a responsiveness of power storage and power supply of the power storage device 13 to be further enhanced. For example, as illustrated in FIG. 4A, the speed command switch unit 51 performs switching from the speed command for base to allow the servomotor for buffer 22 to rotate at the base rotation speed to the speed command for power storage in a stepwise manner.

Further, for example, as illustrated in FIGS. 4B to 4D, it is also possible that the speed command switch unit 51 performs switching of respective speed commands for rotating the servomotor for buffer 22 at the rotation speed for power supply, the base rotation speed, and the rotation speed for power storage in a continuous manner without a gap each between the speed commands. Switching not in a stepwise manner but in a continuous manner without a gap each between the speed commands allows the speed commands not to radically change, which is advantageous in decreasing a load on the servomotor for buffer 22. For example, as illustrated in FIG. 4B, the speed command switch unit 51 performs switching from the speed command for base to allow the servomotor for buffer 22 to rotate at the base rotation speed, while changing the same with a linear time constant, to the speed command for power storage in a stepwise manner. For example, as illustrated in FIG. 4C, the speed command switch unit 51 performs switching from the speed command for base to allow the servomotor for buffer 22 to rotate at the base rotation speed, while changing the same with a bell-shaped time constant, to the speed command for power storage in a stepwise manner. For example, as illustrated in FIG. 4D, the speed command switch unit 51 performs switching from the speed command for base to allow the servomotor for buffer 22 to rotate at the base rotation speed, while changing the same with an exponential time constant, to the speed command for power storage in a stepwise manner.

Note that in the above embodiments, in order to switch a speed of the servomotor for buffer 22 to the rotation speed for power supply, the rotation speed for power storage or the base rotation speed, in accordance with the total power consumption amount, it is configured that the speed command switch unit 51 is provided in the motor control unit for buffer 15, and the speed command switch unit 51 performs switching to the rotation speed for power supply, the rotation speed for power storage, or the base rotation speed in accordance with the total power consumption amount. As a modification example of command for switching a speed of the servomotor for buffer 22 to the rotation speed for power supply, the rotation speed for power storage, or the base rotation speed in accordance with the total power consumption amount, it can be also configured that a position command switch unit (unillustrated) is provided in the motor control unit for buffer 15, and the position command switch unit performs switching to a position command for supply, a position command for power storage, or a position command for base in accordance with the total power consumption amount. For example, the position command for supply, the position command for power storage, and the position command for base may be each set to be such a ramp command as to satisfy a relationship of "a change amount of the position command for supply<a change amount of the position command for base<a change amount of the position command for power storage", and the position command switch unit may switch such a command in accordance with the total power consumption amount. One example is as follows.

Position command for supply [mm]=actual position [mm]+speed command for supply [mm/s]/position gain [1/s]

Position command for power storage [ram]=actual position [mm]+speed command for power storage [mm/s]/position gain [1/s]

Position command for base [mm]=actual position [mm]+speed command for base [mm/s]/position gain [1/s]

Thus, even switching to the position command for supply, the position command for power storage, or the position command for base in accordance with the total power consumption amount can also produce effects similar to those produced by switching to the rotation speed for supply, the rotation speed for power storage, or the rotation speed for base.

In each of the embodiments of switching of a speed command and of switching of a position command, the torque control unit 52 performs a torque control with respect to the servomotor for buffer 22 while changing an upper limit value and a lower limit value of a torque command using a torque limit value calculated by the torque limit value calculation unit 14, and generates a current command.

Figure 5:
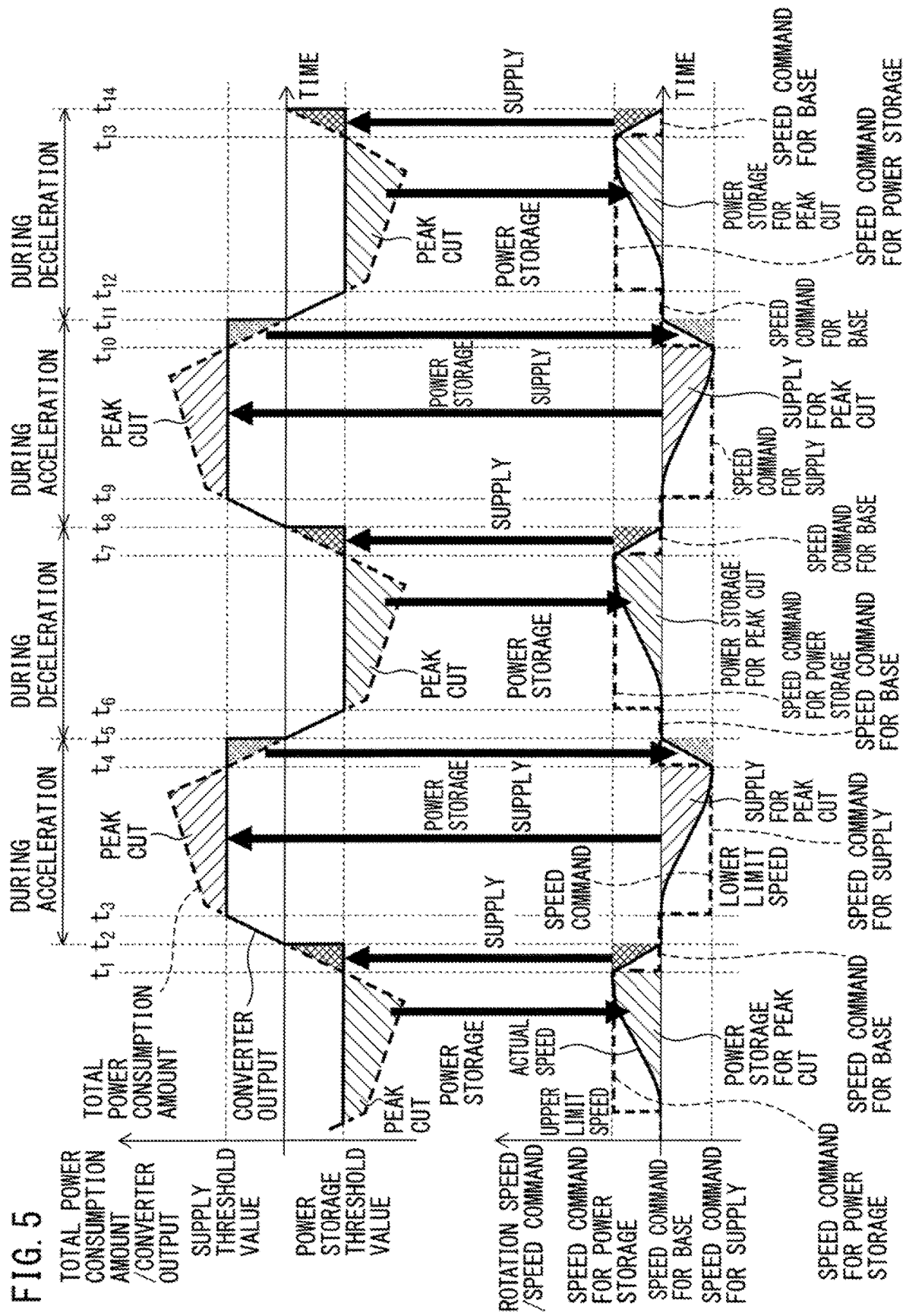
FIG. 5 is a diagram illustrating a relationship between a total power consumption amount and a rotation speed of the servomotor for buffer in the motor drive system according to one embodiment.

FIG. 5 is a diagram illustrating a relationship between a total power consumption amount and a rotation speed of the servomotor for buffer in the motor drive system according to one embodiment. In FIG. 5, the total power consumption amount calculated by the power consumption amount calculation unit 16 (broken line) and an output of the converter 11 (solid line); and a rotation speed of the servomotor for buffer 22 (solid line) and a speed command (broken line) in a case of repeatedly performing deceleration and acceleration of the servomotor for drive 3 are indicated in the upper portion and in the lower portion, respectively.

In FIG. 5, until time $t_1$, when the servomotor for drive 3 is decelerated, a regenerative power is generated and the total power consumption amount calculated by the power consumption amount calculation unit 16 (i.e. sum of an output of the servomotor for drive 3, a winding loss at the servomotor for drive 3, a loss at the converter 11, and a loss at the inverter for drive 12) is decreased. When the total power consumption amount falls below the power storage threshold value, in order to decrease (cut) a power peak, the speed command switch unit 51 outputs the speed command for power storage to allow the servomotor for buffer 22 to rotate at the rotation speed for power storage. The motor control unit for buffer 15 controls a power conversion operation of the inverter for buffer 23 using the speed command for power storage set by the speed command switch unit 51 and a torque limit value calculated by the torque limit value calculation unit 14, whereby a rotation speed of the servomotor for buffer 22 is gradually increased and is stored as a rotation energy of the flywheel 21.

At time $t_1$, when the total power consumption amount calculated by the power consumption amount calculation unit 16 exceeds the power storage threshold value, the speed command switch unit 51 outputs the speed command for base to allow the servomotor for buffer 22 to rotate at the base rotation speed. As a result, the servomotor for buffer 22 is decelerated and a regenerative power is generated. Until the servomotor for buffer 22 returns to the base rotation speed (time $t_2$), a generated AC regenerative power is converted by the inverter for buffer 23 to a DC power and supplied to the DC link 4, and further converted by the converter 11 to an AC power and returned to the power supply 2 side.

Then, when the servomotor for drive 3 is accelerated, the total power consumption amount is gradually increased. When the total power consumption amount exceeds the supply threshold value (time $t_3$), in order to decrease (cut) a power peak, the speed command switch unit 51 outputs the speed command for supply to allow the servomotor for buffer 22 to rotate at the rotation speed for supply. The motor control unit for buffer 15 controls a power conversion operation of the inverter for buffer 23 using the speed command for supply set by the speed command switch unit 51 and a torque limit value calculated by the torque limit value calculation unit 14 using Equation 3, whereby a rotation speed of the servomotor for buffer 22 is gradually decreased and a regenerative power is generated. A generated AC regenerative power is converted by the inverter for buffer 23 to a DC power and supplied to the DC link 4. A DC power supplied to the DC link 4 is converted by the inverter for drive 12 to an AC power and consumed as a drive power of the servomotor for drive 3.

Then, for example, when the servomotor for drive 3 is decelerated, a regenerative power is generated and the total power consumption amount is gradually decreased. When the total power consumption amount is gradually decreased and falls below the supply threshold value (time $t_4$), the speed command switch unit 51 outputs the speed command for base to allow the servomotor for buffer 22 to rotate at the base rotation speed. The motor control unit for buffer 15 controls a power conversion operation of the inverter for buffer 23 using the speed command for base set by the speed command switch unit 51 and a torque limit value calculated by the torque limit value calculation unit 14 using Equation 5. Until the servomotor for buffer 22 returns to the base rotation speed (time $t_5$), due to an energy supplied from the power supply 2 side through the converter 11, a rotation speed of the servomotor for buffer 22 is gradually increased.

At time $t_5$, when the servomotor for buffer 22 comes to rotate at the constant base rotation speed, power storage by the power storage device 13 is terminated, and due to a power regenerated in the servomotor for drive 3, the total power consumption amount is gradually decreased. When the total power consumption amount falls below the power storage threshold value (time $t_6$), in order to decrease (cut) a power peak, the speed command switch unit 51 outputs the speed command for power storage to allow the servomotor for buffer 22 to rotate at the rotation speed for power storage. The motor control unit for buffer 15 controls a power conversion operation of the inverter for buffer 23 using the speed command for power storage set by the speed command switch unit 51 and a torque limit value calculated by the torque limit value calculation unit 14 using Equation 4, whereby a rotation speed of the servomotor for buffer 22 is gradually increased and is stored as a rotation energy of the flywheel 21. Hereinafter, such an operation is performed.

In the above embodiment, when the total power consumption amount falls below the power storage threshold value, the speed command switch unit 51 performs switching from the base speed command to the speed command for power storage to store a power in the power storage device 13, and then, it is determined that storage of a DC power by the power storage device 13 is no longer necessary when the total power consumption amount exceeds the power storage threshold value, and the speed command switch unit 51 performs switching from the speed command for power storage to the base speed command. Similarly, when the total power consumption amount exceeds the supply threshold value, the speed command switch unit 51 performs switching from the base speed command to the speed command for supply to supply a DC power from the power storage device 13 to the DC link 4, and then, it is determined that supply of a DC power by the power storage device 13 is no longer necessary when the total power consumption amount falls below the supply threshold value, and the speed command switch unit 51 performs switching from the speed command for supply to the base speed command.

To modify the above embodiment, it is also possible not to perform switching from the speed command for power storage or the speed command for supply to the base speed command as soon as storage or supply of a DC power by the power storage device 13 is no longer necessary but to perform switching to the base speed command with some time after storage or supply of a DC power by the power storage device 13 is no longer necessary. Such an embodiment will be described with reference to FIG. 6.

FIG. 6 is a diagram illustrating a relationship between the total power consumption amount and a rotation speed of the servomotor for buffer in the motor drive system according to another embodiment. In FIG. 6, the total power consumption amount calculated by the power consumption amount calculation unit 16 (broken line) and an output of the converter 11 (solid line); and a rotation speed of the servomotor for buffer 22 (solid line) and a speed command (broken line) in a case of repeatedly performing deceleration and acceleration of the servomotor for drive 3 are indicated in the upper portion and in the lower portion, respectively. In another embodiment, a third threshold value for returning a rotation speed of the servomotor for buffer 22 from the rotation speed for power supply to the base rotation speed is set to be an upper side base recovery threshold value smaller than the supply threshold value (first threshold value) and larger than the power storage threshold value (second threshold value). Further, a fourth threshold value for returning a rotation speed of the servomotor for buffer 22 from the rotation speed for power storage to the base rotation speed is set to be a lower side base recovery threshold value larger than the power storage threshold value (second threshold value) and smaller than the upper side base recovery threshold value (third threshold value). In other words, in the present embodiment, the motor control unit for buffer 15 controls power conversion of the inverter for buffer 23 so that the servomotor for buffer 22 rotates at the base rotation speed when the total power consumption amount falls below the upper side base recovery threshold value (third threshold value) while the motor control unit for buffer 15 controls power conversion of the inverter for buffer 23 so that the servomotor for buffer 22 rotates at the rotation speed for power supply. Thus, the speed command switch unit 51 in the motor control unit for buffer 15 performs switching from the speed command for supply to the speed command for base when the total power consumption amount falls below the upper side base recovery threshold value (third threshold value) while the motor control unit for buffer 15 controls power conversion of the inverter for buffer 23 so that the servomotor for buffer 22 rotates at the rotation speed for power supply. In such a case, the motor control unit for buffer 15 controls a power conversion operation of the inverter for buffer 23 using the speed command for base set by the speed command switch unit 51 and a torque limit value calculated by the torque limit value calculation unit 14 using Equation 5. Further, the motor control unit for buffer 15 controls power conversion of the inverter for buffer 23 so that the servomotor for buffer 22 rotates at the base rotation speed when the total power consumption amount exceeds the lower side base recovery threshold value (fourth threshold value) while the motor control unit for buffer 15 controls power conversion of the inverter for buffer 23 so that the servomotor for buffer 22 rotates at the rotation speed for power storage. Thus, the speed command switch unit 51 in the motor control unit for buffer 15 performs switching from the speed command for power storage to the speed command for base when the total power consumption amount exceeds the lower side base recovery threshold value (fourth threshold value) while the motor control unit for buffer 15 controls power conversion of the inverter for buffer 23 so that the servomotor for buffer 22 rotates at the rotation speed for power storage. In such a case, the motor control unit for buffer 15 controls a power conversion operation of the inverter for buffer 23 using the speed command for base set by the speed command switch unit 51 and a torque limit value calculated by the torque limit value calculation unit 14 using Equation 6.

For example, in FIG. 6, prior to time $t_1$, while the servomotor for buffer 22 rotates at the rotation speed for power storage in accordance with the speed command for power storage set by the speed command switch unit 51, even when the total power consumption amount is gradually increased and exceeds the power storage threshold value, the speed command for power storage set by the speed command switch unit 51 is maintained. When the total power consumption amount is further increased and exceeds the lower side base recovery threshold value (fourth threshold value) at time $t_1$, the speed command switch unit 51 performs switching from the speed command for power storage to the speed command for base, and the motor control unit for buffer 15 controls a power conversion operation of the inverter for buffer 23 using the speed command for base set by the speed command switch unit 51 and a torque limit value calculated by the torque limit value calculation unit 14 using Equation 6. As a result, the servomotor for buffer 22 is decelerated and a regenerative power is generated. Until the servomotor for buffer 22 returns to the base rotation speed (time $t_2$), a generated AC regenerative power is converted by the inverter for buffer 23 to a DC power and supplied to the DC link 4, and further converted by the converter 11 to an AC power and returned to the power supply 2 side.

Further, between time $t_3$ and time $t_4$, while the servomotor for buffer 22 rotates at the rotation speed for power supply in accordance with the speed command for power supply set by the speed command switch unit 51, even when the total power consumption amount is gradually decreased and falls below the supply threshold value, the speed command for supply set by the speed command switch unit 51 is maintained. When the total power consumption amount is further decreased and falls below the upper side base recovery threshold value (third threshold value) at time $t_4$, the speed command switch unit 51 performs switching from the speed command for supply to the speed command for base, and the motor control unit for buffer 15 controls a power conversion operation of the inverter for buffer 23 using the speed command for base set by the speed command switch unit 51 and a torque limit value calculated by the torque limit value calculation unit 14 using Equation 5. As a result, until the servomotor for buffer 22 returns to the base rotation speed (time $t_5$), using an energy supplied from the power supply 2 side through the converter 11, a rotation speed of the servomotor for buffer 22 is gradually increased.

According to one aspect of the present disclosure, in the motor drive system including a flywheel type power storage device, the power storage device easily controlled and exhibiting a high responsiveness can be realized.

The invention claimed is:

1. A motor drive system comprising:
   a converter configured to perform power conversion between an AC power at a power supply side and a DC power in a DC link;
   an inverter for drive configured to perform power conversion between a DC power in the DC link and an AC power which is a drive power or a regenerative power of a servomotor for drive;
   a power storage device configured to store a DC power from the DC link or supplies a DC power to the DC link, the power storage device including: a flywheel capable of storing a rotation energy; a servomotor for buffer including a rotation shaft to which the flywheel is connected; and an inverter for buffer configured to perform power conversion between a DC power in the DC link and an AC power which is a drive power or a regenerative power of the servomotor for buffer on the basis of a command received; and
   a processor configured to:
   calculate a torque limit value with respect to the servomotor for buffer on a basis of a rotation speed of the servomotor for buffer and a DC power amount stored from the DC link or supplied to the DC link by the power storage device;
   control the buffer for power conversion of the inverter for buffer so as to control rotation of the servomotor for buffer;
   calculate a total power consumption amount obtained as a sum of an output of the servomotor for drive, a winding loss at the servomotor for drive, a loss at the converter, and a loss at the inverter for drive; and
   calculate a DC power amount stored from the DC link or supplied to the DC link by the power storage device on the basis of the total power consumption amount and a maximum power conversion amount specified as a maximum power amount within which power conversion by the converter is possible, wherein
   the processor performs a torque control with respect to the servomotor for buffer while changing an upper limit value and a lower limit value of a torque command using the torque limit value so as to adjust a DC power amount stored from the DC link or supplied to the DC link by the power storage device.

2. The motor drive system according to claim 1, wherein the processor is further configured to calculate the DC power amount stored from the DC link or supplied to the DC link by the power storage device on the basis of a drive efficiency of the servomotor for buffer.

3. The motor drive system according to claim 1, wherein the processor is further configured to calculate, as the total power consumption amount, a further addition of a loss at the inverter for buffer to a sum of an output of the servomotor for drive, a winding loss at the servomotor for drive, a loss at the converter, and a loss at the inverter for drive.

4. The motor drive system according to claim 1, wherein the processor is further configured to:
   control power conversion of the inverter for buffer so that the servomotor for buffer rotates at a rotation speed for power supply smaller than a predetermined base rotation speed when the total power consumption amount exceeds a first threshold value, and
   control power conversion of the inverter for buffer so that the servomotor for buffer rotates at a rotation speed for power storage larger than the base rotation speed when the total power consumption amount falls below a second threshold value smaller than the first threshold value.

5. The motor drive system according to claim 4, wherein the processor is further configured to control power conversion of the inverter for buffer so that the servomotor for buffer rotates at the base rotation speed when the total power consumption amount falls between the first threshold value and the second threshold value.

6. The motor drive system according to claim 4, wherein the processor is further configured to:
   control power conversion of the inverter for buffer so that the servomotor for buffer rotates at the base rotation speed when the total power consumption amount falls below a third threshold value smaller than the first threshold value and larger than the second threshold value while the motor control unit for buffer controls power conversion of the inverter for buffer so that the servomotor for buffer rotates at the rotation speed for power supply, and
   control power conversion of the inverter for buffer so that the servomotor for buffer rotates at the base rotation speed when the total power consumption amount exceeds a fourth threshold value larger than the second threshold value and smaller than the third threshold value while the motor control unit for buffer controls power conversion of the inverter for buffer so that the servomotor for buffer rotates at the rotation speed for power storage.

7. The motor drive system according to claim 4, wherein the first threshold value is set to be the maximum power conversion amount with respect to a conversion operation in which the converter performs power conversion of an AC power to a DC power, or a value smaller than the maximum power conversion amount, and
   the second threshold value is set to be the maximum power conversion amount with respect to an inversion operation in which the converter performs power conversion of a DC power to an AC power, or a value larger than the maximum power conversion amount.

8. The motor drive system according to claim 4, wherein the processor is further configured to perform switching of respective speed commands for rotating the servomotor for buffer at the rotation speed for power supply, the base rotation speed, and the rotation speed for power storage in a stepwise manner each between the speed commands.

9. The motor drive system according to claim 4, wherein the processor is further configured to perform switching of respective speed commands for rotating the servomotor for buffer at the rotation speed for power supply, the base rotation speed, and the rotation speed for power storage in a continuous manner without a gap each between the speed commands.

* * * * *